(12) United States Patent
Kim

(10) Patent No.: US 10,461,358 B2
(45) Date of Patent: Oct. 29, 2019

(54) RECHARGEABLE LITHIUM BATTERY

(75) Inventor: Cheon-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 361 days.

(21) Appl. No.: 13/537,042

(22) Filed: Jun. 28, 2012

(65) Prior Publication Data

US 2013/0089794 A1 Apr. 11, 2013

Related U.S. Application Data

(60) Provisional application No. 61/545,857, filed on Oct. 11, 2011.

(51) Int. Cl.
| | |
|---|---|
| *H01M 10/0564* | (2010.01) |
| *H01M 10/052* | (2010.01) |
| *H01M 2/16* | (2006.01) |
| *H01M 4/13* | (2010.01) |
| *H01M 10/056* | (2010.01) |
| *H01M 10/0569* | (2010.01) |

(52) U.S. Cl.
CPC ........... *H01M 10/052* (2013.01); *H01M 2/16* (2013.01); *H01M 2/1653* (2013.01); *H01M 2/1686* (2013.01); *H01M 4/13* (2013.01); *H01M 10/056* (2013.01); *H01M 10/0569* (2013.01); *Y02E 60/122* (2013.01)

(58) Field of Classification Search
CPC .......... H01M 10/052–10/0569; H01M 2/1686; H01M 10/056; H01M 2/1653; H01M 2/16; H01M 4/13; Y02E 60/122
USPC ....................................................... 429/342
See application file for complete search history.

(56) References Cited

U.S. PATENT DOCUMENTS

| | | | | |
|---|---|---|---|---|
| 5,681,357 A | * | 10/1997 | Eschbach et al. | 29/623.5 |
| 6,465,125 B1 | | 10/2002 | Takami et al. | |
| 2001/0004502 A1 | | 6/2001 | Nakamizo et al. | |
| 2001/0038948 A1 | * | 11/2001 | Jacobs | 429/304 |
| 2002/0160258 A1 | * | 10/2002 | Lee et al. | 429/130 |
| 2004/0219428 A1 | * | 11/2004 | Nagayama | 429/218.1 |
| 2005/0084761 A1 | * | 4/2005 | Hennige et al. | 429/247 |
| 2006/0088762 A1 | | 4/2006 | Okamoto | |
| 2007/0009803 A1 | * | 1/2007 | Kim et al. | 429/251 |
| 2007/0231702 A1 | * | 10/2007 | Fujita | B60L 11/123 429/247 |
| 2007/0254215 A1 | | 11/2007 | Morikawa et al. | |
| 2008/0138702 A1 | * | 6/2008 | Nakamura et al. | 429/163 |
| 2009/0067119 A1 | * | 3/2009 | Katayama | H01G 9/02 361/523 |
| 2009/0148761 A1 | * | 6/2009 | Kikuchi et al. | 429/145 |
| 2009/0197158 A1 | | 8/2009 | Ogawa et al. | |
| 2010/0028783 A1 | | 2/2010 | Nah | |
| 2010/0266904 A1 | * | 10/2010 | Jeon | H01M 10/0525 429/330 |
| 2010/0266905 A1 | * | 10/2010 | Jeon et al. | 429/331 |
| 2010/0291430 A1 | * | 11/2010 | Lee et al. | 429/129 |
| 2010/0304205 A1 | * | 12/2010 | Jo | H01G 9/02 429/144 |
| 2010/0316903 A1 | * | 12/2010 | Kim et al. | 429/145 |
| 2010/0323233 A1 | | 12/2010 | Hennige et al. | |
| 2011/0111305 A1 | | 5/2011 | Jeon et al. | |
| 2011/0183161 A1 | | 7/2011 | Son et al. | |
| 2011/0256443 A1 | | 10/2011 | Park et al. | |
| 2011/0293976 A1 | | 12/2011 | Chiba et al. | |
| 2012/0119155 A1 | * | 5/2012 | Liu et al. | 252/500 |

FOREIGN PATENT DOCUMENTS

| | | |
|---|---|---|
| CN | 1298558 A | 6/2001 |
| CN | 1639887 A | 7/2005 |
| CN | 101803101 A | 8/2010 |
| CN | 101861667 A | 10/2010 |
| EP | 2 031 690 A1 | 3/2009 |
| JP | 05-013105 | 1/1993 |
| JP | 2000-067906 | 3/2000 |
| JP | 2000-149997 | 5/2000 |
| JP | 2001-176482 | 6/2001 |
| JP | 2004-241135 | 8/2004 |
| JP | 2006-120462 | 5/2006 |
| JP | 2008-71732 | 3/2008 |
| JP | 2011-138761 | 7/2011 |
| JP | 2011-526726 | 10/2011 |
| KR | 10-2002-0041647 A | 6/2002 |
| KR | 10-2009-0018003 | 2/2009 |
| KR | 10-2009-0030237 | 3/2009 |
| KR | 10-2010-0003177 | 1/2010 |
| KR | 10-2010-0013806 | 2/2010 |
| KR | 10-2010-0080372 | 7/2010 |
| WO | WO 02/061872 A1 | 8/2002 |
| WO | WO 2009/038358 A1 | 3/2009 |
| WO | WO 2010/002089 A1 | 1/2010 |

OTHER PUBLICATIONS

Arora, Pankaj, and Zhengming Zhang. "Battery separators." Chemical reviews104.10 (2004): 4419-4462.*
Poly(vinylidene fluoride-co-hexafluoropropylene) 427187 specification sheet from Aldrich, accessed from http://www.sigmaaldrich.com/catalog/product/aldrich/427187?lang=en&region=US on May 18, 2015.*
European Search Report dated Feb. 6, 2013, for corresponding European Patent application 12175618.3, (4 pages).
SIPO Office action dated Oct. 9, 2015, with English translation, corresponding to Chinese Patent application 201210279223.7, (22 pages).
SIPO Office action dated Jun. 2, 2016, for corresponding Chinese Patent application 201210279223.7, (10 pages).

(Continued)

*Primary Examiner* — Milton I Cano
*Assistant Examiner* — Philip A. Stuckey
(74) *Attorney, Agent, or Firm* — Lewis Roca Rothgerber Christie LLP

(57) ABSTRACT

A rechargeable lithium battery includes a positive electrode, a negative electrode, a separator between the positive electrode and the negative electrode, a polymer layer on the separator, the polymer layer including a polyvinylidene fluoride based polymer, and an electrolyte solution including an alkyl propionate.

10 Claims, 9 Drawing Sheets

(56) References Cited

OTHER PUBLICATIONS

JPO Office action dated Jun. 14, 2016, for corresponding Japanese Patent application 2012-219629, (4 pages).
KIPO Office action dated May 18, 2016, for corresponding Korean Patent application 10-2012-0084564, (8 pages).
English machine translation of Japanese Publication 05-013105 published Jan. 22, 1993, listed above, (8 pages).
English machine translation of Japanese Publication 2000-067906 published Mar. 3, 2000, listed above, (7 pages).
English machine translation of Japanese Publication 2004-241135 published Aug. 26, 2004, listed above, (12 pages).

* cited by examiner

RECHARGEABLE LITHIUM BATTERY

CROSS-REFERENCE TO RELATED APPLICATIONS

This application claims priority to and the benefit of U.S. Provisional Application No. 61/545,857, filed in the United States Patent and Trademark Office on Oct. 11, 2011, the entire contents of which is incorporated herein by reference.

BACKGROUND

1. Field

This disclosure relates to a rechargeable lithium battery.

2. Description of the Related Art

A lithium rechargeable battery has recently drawn attention as a power source for small portable electronic devices. Lithium rechargeable batteries use an organic electrolyte solution and thereby have twice the discharge voltage of a conventional battery using an aqueous alkali solution. As a result, lithium rechargeable batteries have relatively high energy density.

Rechargeable lithium batteries include an electrode assembly including a positive electrode, a negative electrode facing the positive electrode, a separator between the positive and negative electrodes, and an electrolyte solution impregnating the positive electrode, the negative electrode, and the separator.

The electrolyte solution mainly includes a mixture of a lithium salt and a non-aqueous organic solvent. The non-aqueous organic solvent mainly includes a mixture of linear carbonates and cyclic carbonates.

However, improvements in the cycle-life of rechargeable lithium batteries generally fabricated as described above are limited.

SUMMARY

Aspects of embodiments of the present invention are directed toward a rechargeable lithium battery having good cycle-life and improved safety at overcharge.

In one embodiment of the present invention, a rechargeable lithium battery includes a positive electrode; a negative electrode; a separator between the positive electrode and the negative electrode; a polymer layer on the separator, the polymer layer including a polyvinylidene fluoride based polymer; and an electrolyte impregnating the separator, the electrolyte including an alkyl propionate.

The polymer layer may be at least between the separator and the positive electrode or between the separator and the negative electrode.

The polyvinylidene fluoride based polymer may include a polymer selected from polyvinylidene fluoride, polyvinylidene fluoride-hexafluoropropylene copolymer, or combinations thereof.

The polyvinylidene fluoride based polymer may be loaded at a loading level of 0.5 to 3.0 g/m$^2$. The polyvinylidene fluoride based polymer may be loaded at a loading level of 1.5 to 2.5 g/m$^2$.

The polymer layer may further include a filler selected from organic powder, ceramic powder, or combinations thereof. The polymer layer may include organic powder including polymethylmethacrylate (PMMA). The polymer layer may include ceramic powder selected from $Al_2O_3$, $Mg(OH)_2$, or combinations thereof.

The ceramic powder may be included at 0.1 to 98 wt % based on the total weight of the polymer layer. The ceramic powder may be included at 3 to 20 wt % based on the total weight of the polymer layer.

The alkyl propionate may include a C1-10 alkyl propionate. The alkyl propionate may include a compound selected from methyl propionate, ethyl propionate, or combinations thereof. The alkyl propionate may be included at 10 to 70 volume % based on the total volume of the electrolyte. The alkyl propionate may be included at 20 to 70 volume % based on the total volume of the electrolyte. The alkyl propionate may be included at 50 to 60 volume % based on the total volume of the electrolyte.

The electrolyte may further include a lithium salt and a non-aqueous organic solvent.

The electrolyte may further include a carbonate-based solvent, and the carbonate-based solvent and the alkyl propionate may be included at a volume ratio of 4:6 to 5:5.

The electrolyte may be a liquid.

BRIEF DESCRIPTION OF THE DRAWINGS

The features and aspects of embodiments of the present invention will be more apparent from the following detailed description in conjunction with the accompanying drawings.

DETAILED DESCRIPTION

Exemplary embodiments of this disclosure will hereinafter be described in detail. However, these embodiments are only exemplary, and this disclosure is not limited thereto.

Figure 1:
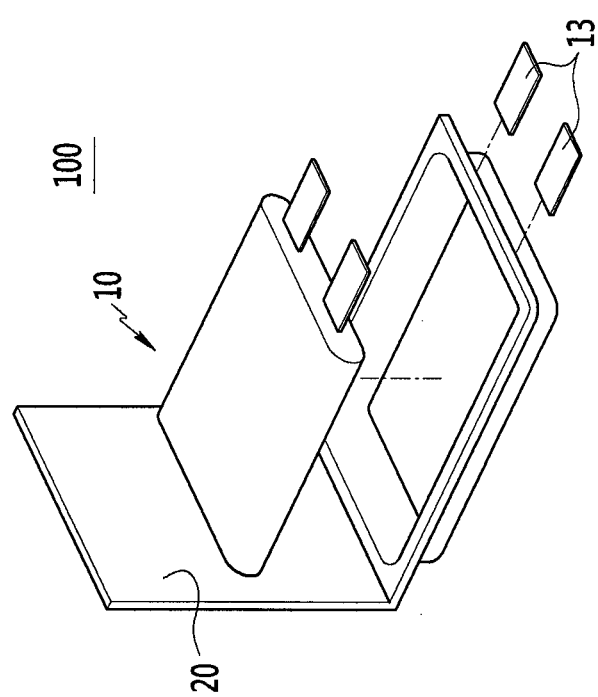
FIG. 1 is a schematic view of a rechargeable lithium battery according to one embodiment.
Figure 2:
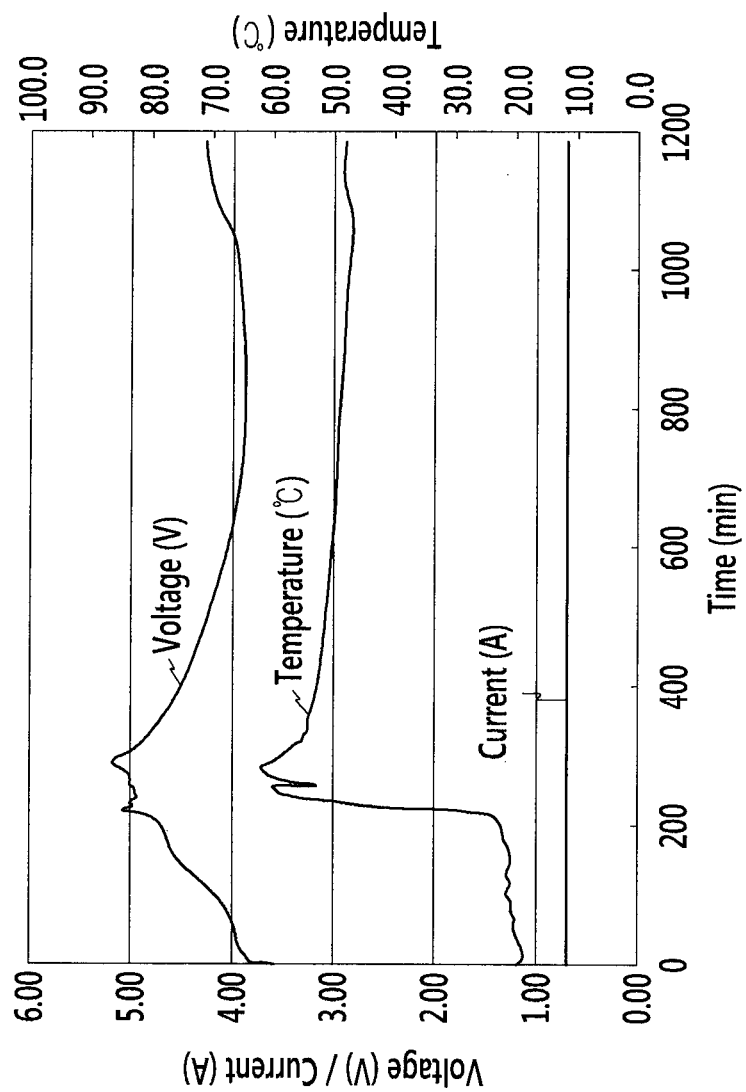
FIGS. 2 to 9 are graphs showing the state of the rechargeable lithium batteries according to Examples 1 to 6 and Comparative Examples 1 and 2 at overcharge.
Figure 3:
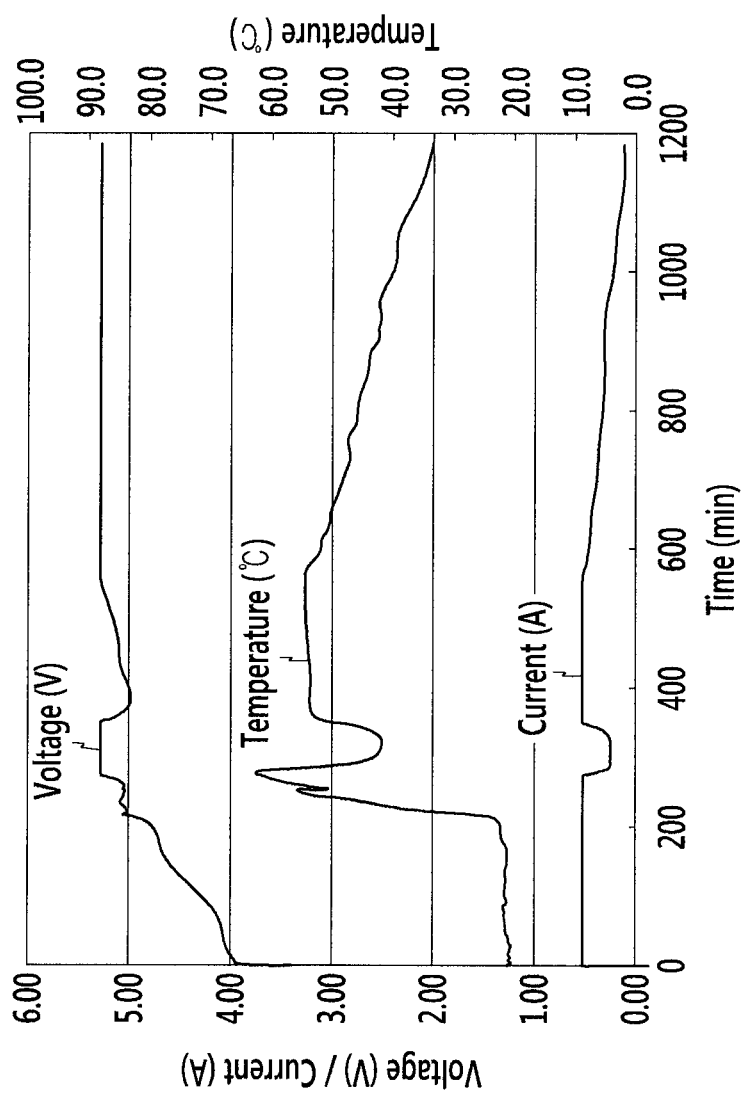
Figure 4:
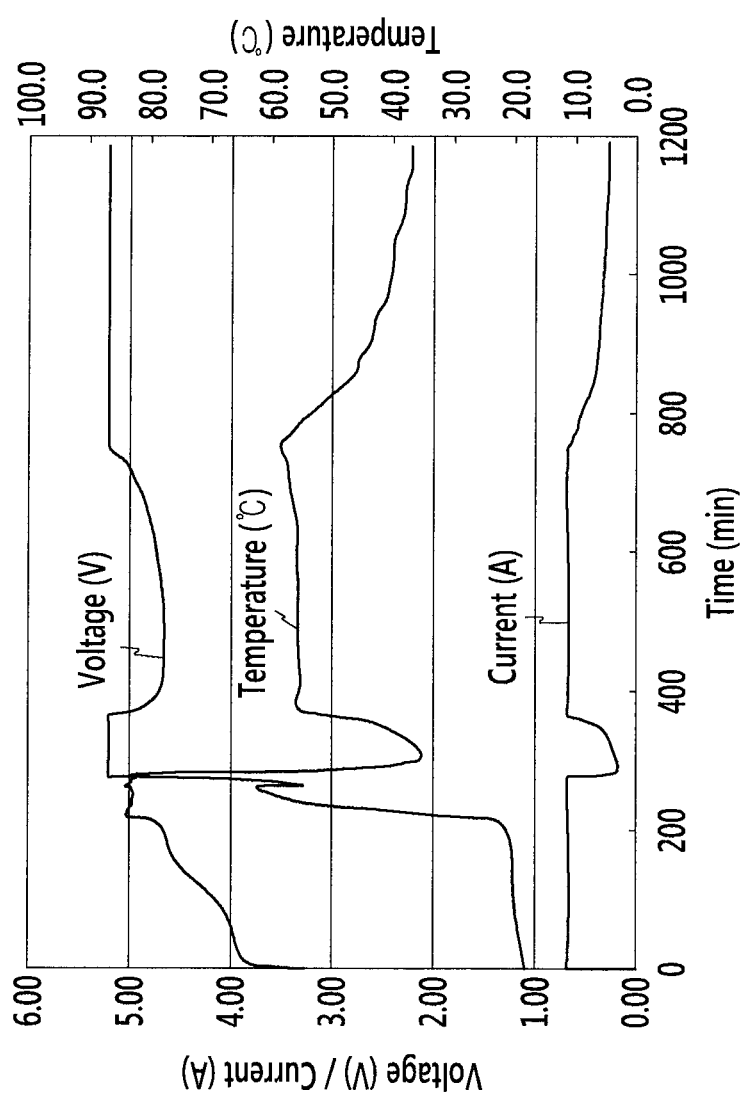
Figure 5:
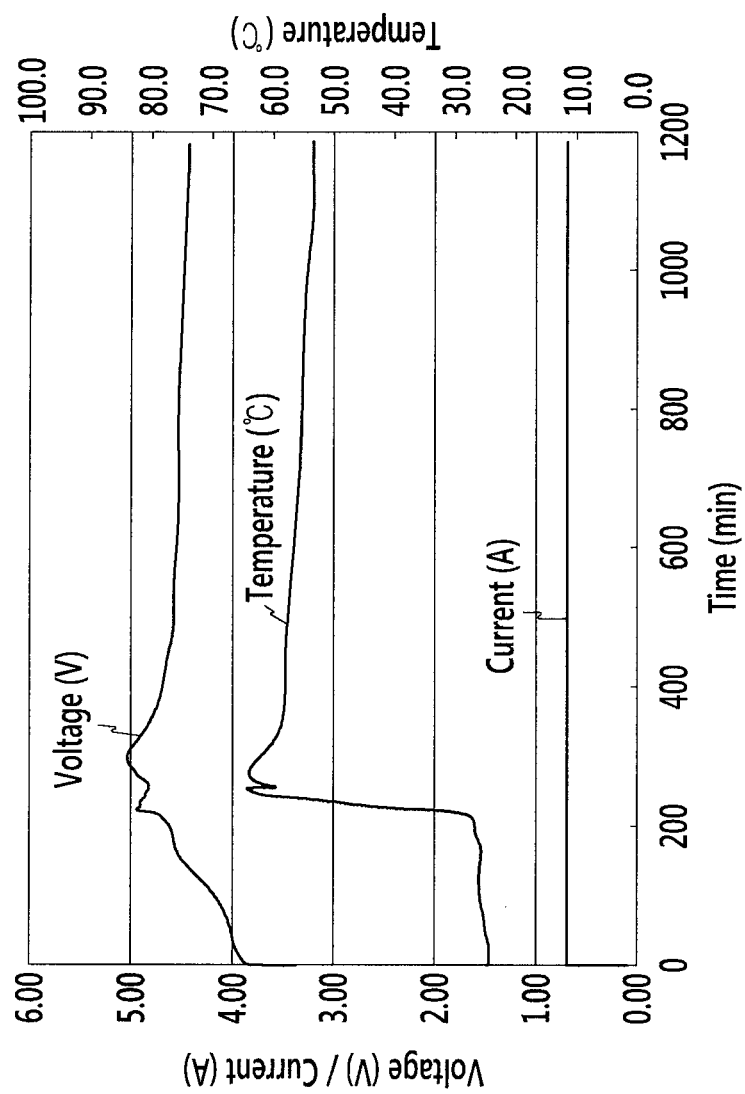
Figure 6:
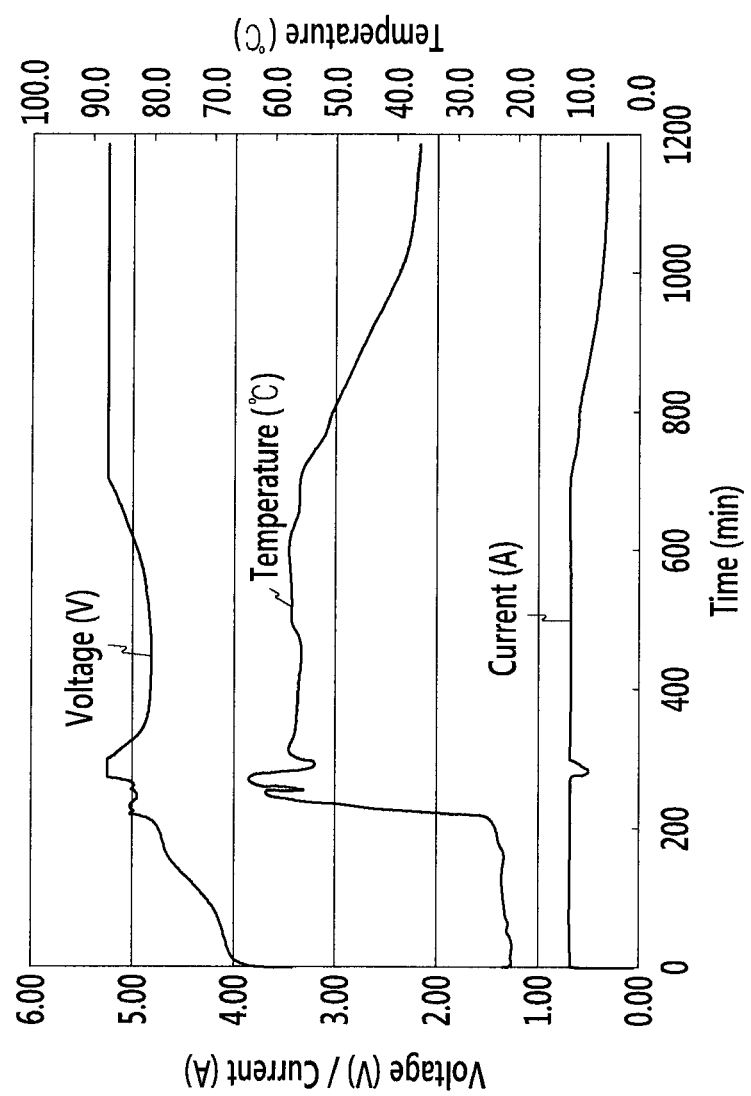
Figure 7:
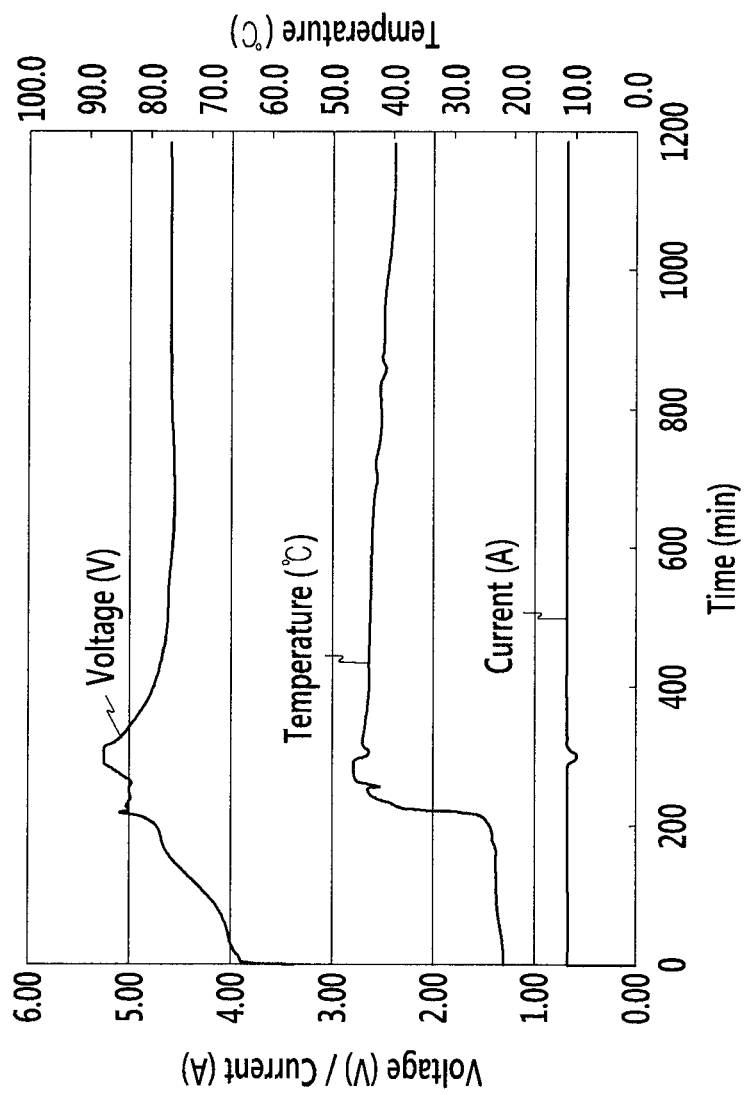
Figure 8:
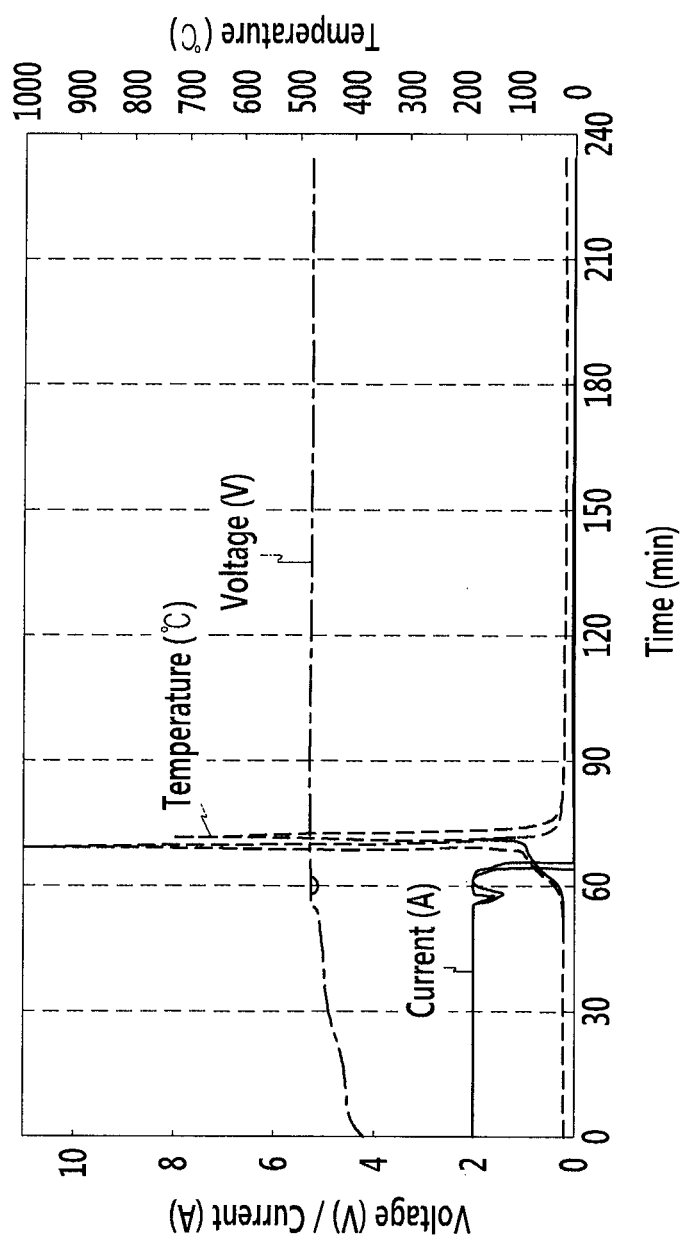
Figure 9:
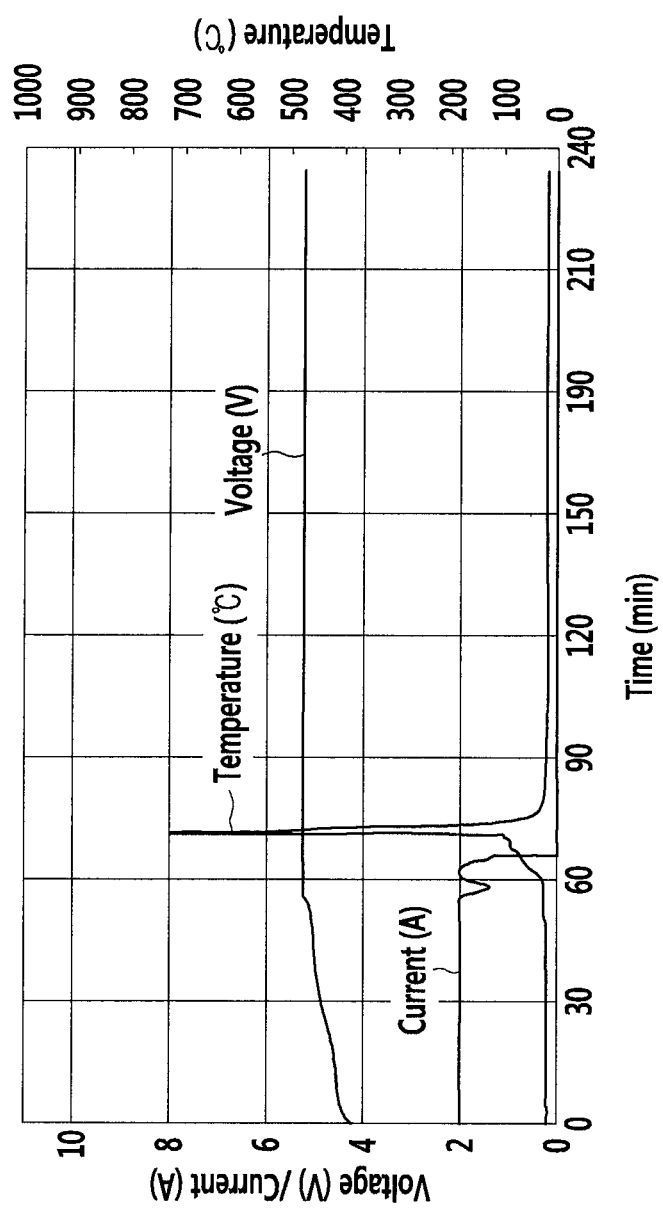

A rechargeable lithium battery according to one embodiment is illustrated in FIG. 1. FIG. 1 is the schematic view of a rechargeable lithium battery according to one embodiment.

Referring to FIG. 1, a rechargeable lithium battery 100 according to one embodiment includes an electrode assembly 10, a pouch case 20 containing the electrode assembly, and electrode tabs 13 electrically channeling a current generated from the electrode assembly to the outside. The pouch case 20 is sealed by overlapping the two of its sides facing each other.

The electrode assembly 10 includes a positive electrode, a negative electrode facing the positive electrode, a separator interposed between the positive electrode and the negative electrode, and an electrolyte solution impregnating the negative and positive electrodes and the separator.

According to one embodiment, a rechargeable lithium battery may be a cylindrical battery, a prismatic battery, a coin battery, a pouch battery, or the like. In some embodiments, a rechargeable lithium battery may be a pouch battery as shown in FIG. 1.

The separator may be a single layer or a multi-layer, and made of, for example, glass fiber, polyester, Teflon, polyethylene, polypropylene, polytetrafluoroethylene, or a combination thereof.

The separator may include a polymer layer on the surface. In particular, the polymer layer may be disposed on the surface of the separator at least either (1) between the surface of the separator and the surface of the positive electrode or (2) between the surface of the separator and the surface of the negative electrode.

The polymer layer may include polyvinylidene fluoride based polymer. The polyvinylidene fluoride based polymer may include a polymer selected from polyvinylidene fluoride, polyvinylidene fluoride-hexafluoropropylene copolymer, or a combination thereof.

When the polymer layer including the polyvinylidene fluoride based polymer is formed on the surface of the separator, the separator may be more thoroughly impregnated by the electrolyte solution and thus, improve the cycle-life characteristics of the rechargeable lithium battery and improve safety at overcharge. It may also more strongly adhere the separator to a substrate (e.g., an electrode) and thus, increase strength of the rechargeable lithium battery and reduce the thickness of the rechargeable lithium battery.

The polyvinylidene fluoride based polymer may be loaded at a loading level ranging from 0.5 to 3.0 g/m$^2$ and specifically, from 1.5 to 2.5 g/m$^2$ (i.e., in some embodiments, the loading level may be 1.6 g/m$^2$, while in other embodiments, the loading level may be 2.0 g/m$^2$). The loading level indicates a polymer weight per unit area on the surface of a separator. In one embodiment the polyvinylidene fluoride based polymer is loaded at a loading level within the above described range, the separator is more thoroughly impregnated by an electrolyte solution, thereby improving conductivity of the rechargeable lithium battery, and the separator is also more strongly adhered to a binder in a substrate (e.g., an electrode), thereby fabricating a rechargeable lithium battery with improved strength.

The polymer layer may be formed by mixing the polyvinylidene fluoride based polymer and a filler. The filler may include one selected from organic powder, ceramic powder, or a combination thereof.

The organic powder may include polymethylmethacrylate (PMMA). The ceramic powder may include one selected from $Al_2O_3$, $Mg(OH)_2$, or a combination thereof.

The ceramic powder may be included in an amount of 0.1 to 98 wt % based on the total weight of the polymer layer. In some embodiments, the ceramic powder may be included at 3 to 20 wt % based on the total weight of the polymer layer. In one embodiment, when the ceramic powder is included within the above described range, static electricity is lowered, and friction is decreased, thereby improving the process of making the lithium battery.

The electrolyte solution may include alkyl propionate. When the alkyl propionate is included in the electrolyte solution, the polyvinylidene fluoride based polymer forming the polymer layer on the surface of the separator and the alkyl propionate may have good compatibility and thus, aid in the impregnation of the electrolyte solution in the separator and the negative and positive electrodes. Accordingly, the present invention may provide a rechargeable lithium battery with good cycle-life characteristics and improved safety at overcharge.

The alkyl propionate may include a C1 to C10 alkyl group. In some embodiments, the alkyl propionate may include one selected from methyl propionate, ethyl propionate, or a combination thereof. These materials have low viscosity and good compatibility with the polyvinylidene fluoride based polymer, thereby enabling the fabrication of a rechargeable lithium battery with improved cycle-life characteristics and improved safety at overcharge.

The alkyl propionate may be included in an amount of 10 to 70 volume % based on the total weight of the electrolyte. In some embodiments, the alkyl propionate may be included at 20 to 70 volume %, based on the total weight of the electrolyte, while in other embodiments, the alkyl propionate may be included at 30 to 70 volume % based on the total weight of the electrolyte. In other embodiments, the alkyl propionate may be included at 40 to 70 volume % based on the total weight of the electrolyte, while in still other embodiments, the alkyl propionate may be included at 50 to 60 volume % based on the total weight of the electrolyte solution. In one embodiment, when the alkyl propionate is included in the electrolyte solution within the above described range, the alkyl propionate has better compatibility with the polyvinylidene fluoride based polymer forming the polymer layer on the surface of a separator and thus, the electrolyte solution better impregnates the separator and the negative and positive electrodes. Accordingly, embodiments of the present invention may provide a rechargeable lithium battery with good cycle-life characteristics and improved safety at overcharge.

The electrolyte solution may include a lithium salt and a non-aqueous organic solvent other than the alkyl propionate.

The lithium salt dissolved in the non-aqueous organic solvent supplies lithium ions in the battery and improves lithium ion transportation between positive and negative electrodes.

The lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$ (lithium bis(oxalato) borate; LiBOB), or a combination thereof.

The lithium salt may be used at a concentration ranging from about 0.1 M to about 2.0 M. In one embodiment, when the lithium salt is included at the above concentration range, an electrolyte solution has good performance and lithium ion mobility as a result of the electrolyte solution having the selected conductivity and viscosity.

The non-aqueous organic solvent serves as a medium for transmitting ions taking part in the electrochemical reaction of a battery. The non-aqueous organic solvent may include one selected from a carbonate-based solvent, an ester-based solvent, an ether-based solvent, a ketone-based solvent, an alcohol-based solvent, an aprotic solvent, or a combination thereof.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When the carbonate-based solvent is prepared by mixing a cyclic carbonate and a linear carbonate, the solvent may have a low viscosity while having an increased dielectric constant. In one embodiment, the cyclic carbonate and the linear carbonate are mixed together in a volume ratio of about 1:1 to 1:9.

The ester-based solvent may include, for example, methyl acetate, ethyl acetate, n-propyl acetate, methyl propionate, ethyl propionate, γ-butyrolactone, decanolide, valerolactone, mevalonolactone, caprolactone, or the like.

The ether-based solvent may include, for example, dibutylether, tetraglyme, diglyme, dimethoxyethane, 2-methyltetrahydrofuran, tetrahydrofuran, or the like.

The ketone-based solvent may include cyclohexanone or the like.

The alcohol-based solvent may include ethanol, isopropyl alcohol, or the like.

The non-aqueous organic solvent may be used singularly or in a mixture. When the organic solvent is used in a mixture, the mixture ratio can be controlled in accordance with a desired battery performance.

The non-aqueous electrolyte solution may further include an overcharge-inhibiting additive such as ethylene carbonate, pyrocarbonate, or the like.

The positive electrode may include a current collector and a positive active material layer on the current collector. The positive active material layer may include a positive active material, a binder, and optionally, a conductive material.

The current collector may be Al (aluminum), but it is not limited thereto.

The positive active material includes a lithiated intercalation compound that reversibly intercalates and deintercalates lithium ions. The positive active material may include a composite oxide including lithium and at least one of cobalt, manganese, nickel, or a combination thereof. For example, the following lithium-containing compounds may be used:

$Li_aA_{1-b}B_bD_2$ (wherein $0.90 \leq a \leq 1.8$ and $0 \leq b \leq 0.5$); $Li_aE_{1-b}B_bO_{2-c}D_c$ (wherein $0.90 \leq a \leq 1.8$, $0 \leq b \leq 0.5$, $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aN_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $LiFePO_4$.

In the above formulas, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The lithiated intercalation compounds may have a coating layer on their surface, or may be mixed with another compound having a coating layer. The coating layer may include at least one coating element compound selected from an oxide of a coating element, a hydroxide of a coating element, an oxyhydroxide of a coating element, an oxycarbonate of a coating element, or a hydroxyl carbonate of a coating element. The coating element compound of the coating layer may be amorphous or crystalline. The coating element included in the coating layer may include Mg, Al, Co, K, Na, Ca, Si, Ti, V, Sn, Ge, Ga, B, As, Zr, or a mixture thereof. Using these elements in the compound, the coating layer may be disposed via a method having no adverse impact (or substantially no adverse impact) on the properties of the positive active material. For example, the coating layer may be disposed by a method such as spray coating, dipping, or the like. However, these methods are not illustrated in more detail because they are known to those who work in related fields.

The binder improves the binding properties of the positive active material particles to each other and to the current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but the binder is not limited thereto.

The conductive material is included to improve electrode conductivity. Any electrically conductive material may be used as a conductive material as long as it does not cause a chemical change in the battery. Examples of the conductive material include carbon-based materials such as natural graphite, artificial graphite, carbon black, acetylene black, ketjen black, carbon fibers, or the like; metal-based materials including metal powder or metal fiber including one or more of copper, nickel, aluminum, or silver; conductive polymers such as polyphenylene derivatives; or a mixture thereof.

The negative electrode includes a negative current collector and a negative active material layer disposed thereon.

The negative current collector may be a copper foil.

The negative active material layer may include a negative active material, a binder, and optionally a conductive material.

The negative active material includes a material that reversibly intercalates/deintercalates lithium ions, a lithium metal, a lithium metal alloy, a material capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, or Sn.

The material capable of doping/dedoping lithium may include Si, $SiO_x$ ($0<x<2$), a Si—C composite, a Si—Y alloy (wherein Y is not Si and is selected from an alkali metal, an alkaline-earth metal, Group 13 to Group 16 elements, a transition element, a rare earth element, or a combination thereof), Sn, $SnO_2$, a Sn—C composite, a Sn—Y alloy (wherein Y is not Si and is selected from an alkali metal, an alkaline-earth metal, Group 13 to Group 16 elements, a transition element, a rare earth element, or a combination thereof), or the like. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, or the like.

The binder improves the binding properties of the negative active material particles with one another and with the current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but the binder is not limited thereto.

The conductive material is included to improve electrode conductivity. Any electrically conductive material may be used as a conductive material as long as it does not cause a chemical change in the battery. Examples of the conductive material include carbon-based materials such as natural graphite, artificial graphite, carbon black, acetylene black, ketjen black, carbon fibers, or the like; metal-based materials including metal powder or metal fiber including one or more of copper, nickel, aluminum, or silver; conductive polymers such as polyphenylene derivatives; or a mixture thereof.

The negative electrode and positive electrode may be respectively fabricated by mixing an active material, a conductive material, and a binder into an active material composition and coating the composition on a current collector.

The electrode manufacturing method is known, and thus it is not described in detail in the present specification. A solvent, such as N-methylpyrrolidone, may be used in the active material composition, but the solvent is not limited thereto.

Hereinafter, the embodiments are illustrated in more detail with reference to examples. However, the following are exemplary embodiments and are not limiting.

Furthermore, what is not described in this specification that is sufficiently understood by those ordinary skill in the art may not be described or illustrated herein.

(Fabrication of Rechargeable Lithium Battery Cell)

EXAMPLE 1

A positive active material layer composition was prepared by mixing $LiCoO_2$ (positive active material), polyvinylidene fluoride (PVdF) (binder), and carbon (conductive material) at a weight ratio of 92:4:4 and dispersing the mixture in N-methyl-2-pyrrolidone (solvent). The positive active material layer composition was coated on a 12 μm thick aluminum foil current collector and compressed, thereby fabricating a positive electrode.

A negative active material layer composition was prepared by mixing graphite (negative active material), styrene-butadiene rubber (SBR) (binder), and carboxylmethylcellulose (CMC) (thickener/binder) at a weight ratio of 98:1:1 and dispersing the mixture in water. The negative active material layer composition was coated on a 8 μm-thick copper foil (current collector), dried, and compressed, thereby fabricating a negative electrode.

Then, an electrolyte solution was prepared by mixing ethylene carbonate (EC), propylene carbonate (PC), and ethyl propionate (EP) at a volume ratio of 3:1:6 and dissolving 1.3 M $LiPF_6$ and 0.2 parts by weight of $LiBF_4$ (based on 100 parts by weight of the mixed solution) therein.

The positive and negative electrodes and the electrolyte solution were used with a polyethylene separator to fabricate a laminate-type battery cell having a capacity of 1400 mAh/g at 1 C. The polyethylene separator was coated (on both sides) with polyvinylidene fluoride at a loading level of 2.3 $g/m^2$.

EXAMPLE 2

A half-cell was fabricated according to the same method as Example 1 except that the mixed electrolyte solution included ethylene carbonate (EC), ethylmethyl carbonate (EMC), and ethyl propionate (EP) at a volume ratio of 3:1:6.

EXAMPLE 3

A half-cell was fabricated according to the same method as Example 1 except that the mixed electrolyte solution included ethylene carbonate (EC), diethyl carbonate (DEC), and ethyl propionate (EP) at a volume ratio of 3:1:6.

EXAMPLE 4

A half-cell was fabricated according to the same method as Example 1 except that the mixed electrolyte solution included ethylene carbonate (EC), propylene carbonate (PC), ethylmethyl carbonate (EMC), and ethyl propionate (EP) at a volume ratio of 3:1:1:5.

EXAMPLE 5

A half-cell was fabricated according to the same method as Example 1 except that the mixed electrolyte solution included ethylene carbonate (EC), ethylmethyl carbonate (EMC), diethylcarbonate (DEC), and ethyl propionate (EP) at a volume ratio of 3:1:1:5.

EXAMPLE 6

A half-cell was fabricated according to the same method as Example 1 except that the mixed electrolyte solution included ethylene carbonate (EC), propylene carbonate (PC), diethylcarbonate (DEC), and ethyl propionate (EP) at a volume ratio of 3:1:1:5.

COMPARATIVE EXAMPLE 1

A half-cell was fabricated according to the same method as Example 1 except that the mixed electrolyte solution included ethylene carbonate (EC), ethylmethyl carbonate (EMC), and diethylcarbonate (DEC) at a volume ratio of 3:5:2, the $LiPF_6$ was 1.15 M, and 0.2 parts by weight of $LiBF_4$ was included based on 100 parts by weight of the mixed solution.

COMPARATIVE EXAMPLE 2

A half-cell was fabricated according to the same method as Example 1 except that the polyethylene separator was not coated with polyvinylidene fluoride.

Evaluation 1: Rechargeable Lithium Battery Cell at Overcharge

Each rechargeable lithium battery cell according to Examples 1 to 6 and Comparative Examples 1 and 2 were overcharged and voltage and temperature were measured. The results are provided in FIGS. 2 to 9.

Each of the rechargeable lithium battery cells according to Examples 1 to 6 and Comparative Examples 1 and 2 were charged with 2 A, 5.25 V, and 950 mAh.

FIGS. 2 to 9 are graphs respectively showing state of the rechargeable lithium battery cells according to Examples 1 to 6 and Comparative Examples 1 and 2 at overcharge.

Referring to FIGS. 2 to 9, the rechargeable lithium battery cells using a separator coated with a polymer layer including polyvinylidene fluoride based polymer on the surface and an electrolyte solution including alkyl propionate according to Examples 1 to 6 were safer at overcharge than the rechargeable lithium battery cell using an electrolyte solution including no alkyl propionate, as in Comparative Example 1, and the rechargeable lithium battery cell using a separator not coated with a polymer layer including polyvinylidene fluoride based polymer on the surface, as in Comparative Example 2.

Evaluation 2: Safety of Rechargeable Lithium Battery Cell at Overcharge

Charged (i.e., fully charged) rechargeable lithium battery cells according to Examples 1 to 6 were overcharged with 700 mA and 5.25 V for 10 hours, and charged (i.e., fully charged) rechargeable lithium battery cells according to Comparative Examples 1 and 2 were overcharged with 2 A and 5.25 V for 230 min. They were examined to evaluate safety at overcharge. The results are provided in the following Table 1.

The safety at overcharge was evaluated according to the following criteria: L1: ignition, L5: Rupture, L10: Good.

TABLE 1

|  | Mixed composition of electrolyte solution (volume ratio) | Discharge capacity (mAh) at formation | Safety at overcharge |
|---|---|---|---|
| Example 1 | EC/PC/EP (3/1/6) | 1453.1 | L5 |
| Example 2 | EC/EMC/EP (3/1/6) | 1418.9 | L10 |
| Example 3 | EC/DEC/EP (3/1/6) | 1466.4 | L10 |
| Example 4 | EC/PC/EMC/EP (3/1/1/5) | 1471.9 | L5 |
| Example 5 | EC/EMC/DEC/EP (3/1/1/5) | 1440.5 | L10 |
| Example 6 | EC/PC/DEC/EP (3/1/1/5) | 1475.9 | L5 |
| Comparative Example 1 | EC/EMC/DEC (3/5/2) | 1402 | L1 |
| Comparative Example 2 | EC/PC/EP (3/1/6) | 1410.4 | L1 |

Referring to Table 1, the rechargeable lithium battery cells using a separator including a polymer layer including a polyvinylidene fluoride based polymer on the surface and an electrolyte solution including alkyl propionate according to Examples 1 to 6 were safer at overcharge than the rechargeable lithium battery cell using an electrolyte solution including no alkyl propionate, as in Comparative Example 1, and the rechargeable lithium battery cell using a separator not coated with a polymer layer including polyvinylidene fluoride based polymer on the surface, as in Comparative Example 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

100: rechargeable lithium battery
10: electrode assembly
20: pouch case
13: electrode tab

What is claimed is:

1. A rechargeable lithium battery comprising:
   a positive electrode;
   a negative electrode;
   a separator between the positive electrode and the negative electrode;
   a polymer layer on the separator, the polymer layer comprising polyvinylidene fluoride, the polyvinylidene fluoride loaded at a loading level of 1.5 to 2.5 g/m$^2$; and
   an electrolyte impregnating the separator, the electrolyte comprising a carbonate-based solvent and an alkyl propionate in a volume ratio of 4:6 to 5:5, the alkyl propionate comprising a compound selected from the group consisting of methyl propionate, ethyl propionate, and a combination thereof,
   wherein the carbonate-based solvent comprises a cyclic carbonate-based solvent and a linear carbonate-based solvent in a volume ratio of 4:1 to 3:2, and the linear carbonate-based solvent is one or more selected from the group consisting of dimethyl carbonate, diethyl carbonate, dipropyl carbonate, methylpropyl carbonate, ethylpropyl carbonate, methylethyl carbonate, ethylmethyl carbonate and butylene carbonate.

2. The rechargeable lithium battery of claim 1, wherein the polymer layer is at least between the separator and the positive electrode or between the separator and the negative electrode.

3. The rechargeable lithium battery of claim 1, wherein the polymer layer further comprises a filler selected from the group consisting of an organic powder, a ceramic powder, and combinations thereof.

4. The rechargeable lithium battery of claim 3, wherein the organic powder comprises polymethylmethacrylate (PMMA).

5. The rechargeable lithium battery of claim 3, wherein the ceramic powder is selected from the group consisting of $Al_2O_3$, $Mg(OH)_2$, and combinations thereof.

6. The rechargeable lithium battery of claim 3, wherein the ceramic powder is included at 0.1 to 98 wt % based on the total weight of the polymer layer.

7. The rechargeable lithium battery of claim 6, wherein the ceramic powder is included at 3 to 20 wt % based on the total weight of the polymer layer.

8. The rechargeable lithium battery of claim 1, wherein the electrolyte further comprises a lithium salt and a non-aqueous organic solvent.

9. The rechargeable lithium battery of claim 1, wherein the electrolyte is a liquid.

10. The rechargeable lithium battery of claim 1, wherein the cyclic carbonate-based solvent and the linear carbonate-based solvent are in a volume ratio of 3:1 to 3:2.

* * * * *